Aug. 3, 1965  G. R. CHAFEE, JR  3,198,903
CONTROL SWITCH ASSEMBLY, PARTICULARLY FOR
APPLIANCES SUCH AS CLOTHES DRYERS
Filed July 12, 1962  4 Sheets-Sheet 1

FIG. I

INVENTOR.
GLENN R. CHAFEE JR.
BY Derek P. Lawrence
HIS ATTORNEY

Aug. 3, 1965  G. R. CHAFEE, JR  3,198,903
CONTROL SWITCH ASSEMBLY, PARTICULARLY FOR
APPLIANCES SUCH AS CLOTHES DRYERS
Filed July 12, 1962  4 Sheets-Sheet 3
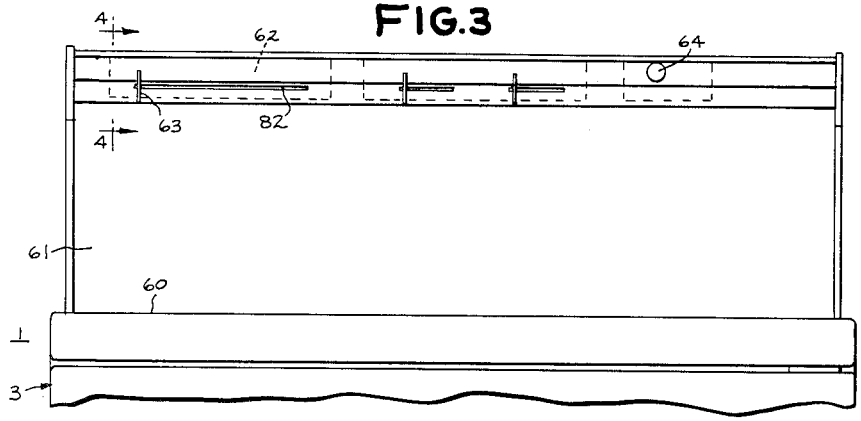
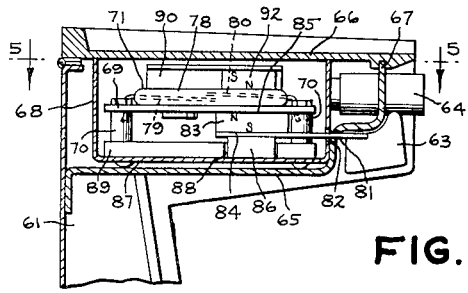
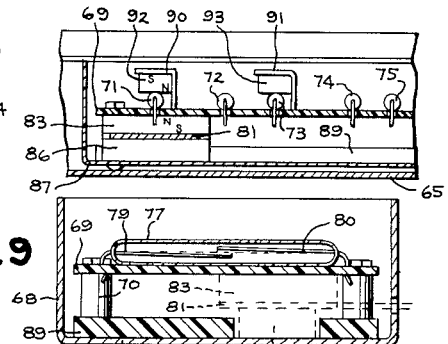
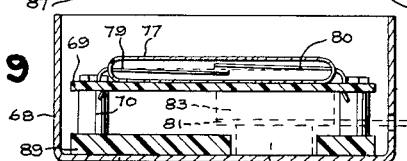
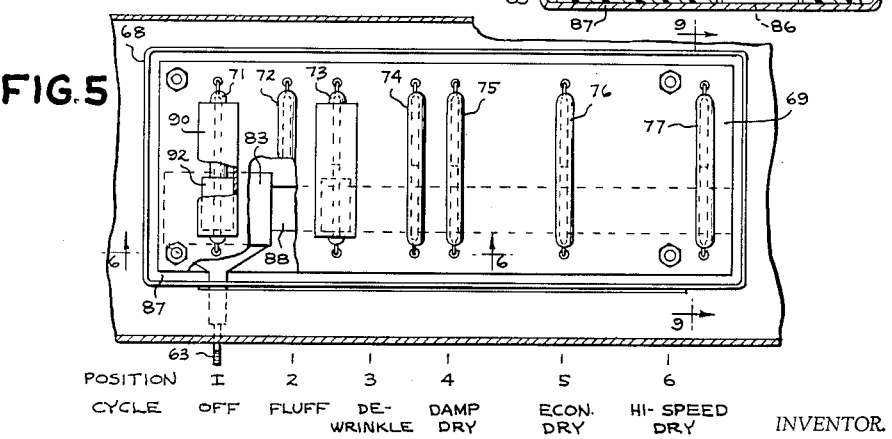
INVENTOR.
BY Derek P Lawrence
HIS ATTORNEY

| CYCLE | REED SWITCHES | | | | | | |
|---|---|---|---|---|---|---|---|
| | 71 | 72 | 73 | 74 | 75 | 76 | 77 |
| HI SPEED | × | O | × | O | O | O | × |
| ECONOMY | × | O | × | O | O | × | O |
| DAMP | × | O | × | × | × | O | O |
| DE-WRINKLE | × | O | O | × | O | O | O |
| FLUFF | × | × | O | O | O | O | O |
| OFF | O | O | × | O | O | O | O |

INVENTOR.
GLENN R. CHAFEE JR.

United States Patent Office 3,198,903
Patented Aug. 3, 1965

3,198,903
CONTROL SWITCH ASSEMBLY, PARTICULARLY FOR APPLIANCES SUCH AS CLOTHES DRYERS
Glenn R. Chafee, Jr., Louisville, Ky., assignor to General Electric Company, a corporation of New York
Filed July 12, 1962, Ser. No. 209,466
3 Claims. (Cl. 200—87)

This invention relates to control switch assemblies, and more particularly to control switch assemblies which utilize reed members of magnetic material and which find a particularly high degree of usefulness in appliances such as clothes dryers.

It is an object of my invention to provide an improved switching assembly utilizing magnetic reed switch elements and controlled by a manually movable permanent magnet.

More particularly, it is an object of my invention to provide such a structure wherein the permanent magnet is positioned in a novel relationship to the reed switch elements.

A further specific object of my invention is to provide such an assembly wherein a novel magnetic shielding arrangement is provided to achieve the appropriate opening and closing of elements.

Yet a further object is the provision of my improved switching assembly in a clothes dryer so as to provide a number of separate cycles for the dryer.

In carrying out my invention in one form thereof, I provide a switch assembly wherein a plurality of magnetic reed elements are each secured at one end within a housing, and are respectively engageable with a plurality of electric contact means of magnetic material also secured within the housing. A permanent magnet, preferably of the wafer type wherein the poles are quite close to each other on opposite faces, is positioned so that one pole faces the reed elements and the other pole faces away from the reed elements. Means are provided extending through the housing and secured to the magnet for moving the magnet along a predetermined path within the housing. This permits the magnet to be moved selectively into proximity with various of the reed elements to complete a flux path. In the case of each reed element, this flux path, when the magnet is adjacent thereto, extends from the one pole of the magnet through the reed element to its associated contact means, and then back to the other pole of the magnet.

As an additional desirable feature, a shield of magnetic materials may be positioned about one or more of the reed elements so as to form a barrier against the flux from the magnet until the magnet reaches a predetermined position. Thus, the reed elements may be positioned quite closely together and the shield will insure that only those directly facing the pole of the magnet will be affected.

The subject matter which I regard as my invention is particularly pointed out and distinctly claimed in the concluding portion of this specification. My invention, however, both as to organization and method of operation together with further objects and advantages thereof, may best be understood by reference to the following description taken in conjunction with the accompanying drawings.

In the drawings, FIGURE 1 is a side elevational view of a clothes dryer incorporating my improved control switch assembly, the view being partly broken away and partly sectionalized in order to illustrate details;

FIGURE 3 is an enlarged fragmentary front elevational view of the dryer of FIGURES 1 and 2, illustrating the control panel thereof;

FIGURE 4 is a sectional view along line 4—4 in FIGURE 3;

FIGURE 5 is a sectional view along line 5—5 in FIGURE 4;

FIGURE 6 is a sectional view along line 6—6 in FIGURE 5;

FIGURE 9 is a sectional view along line 9—9 in FIGURE 5.

Figure 1:
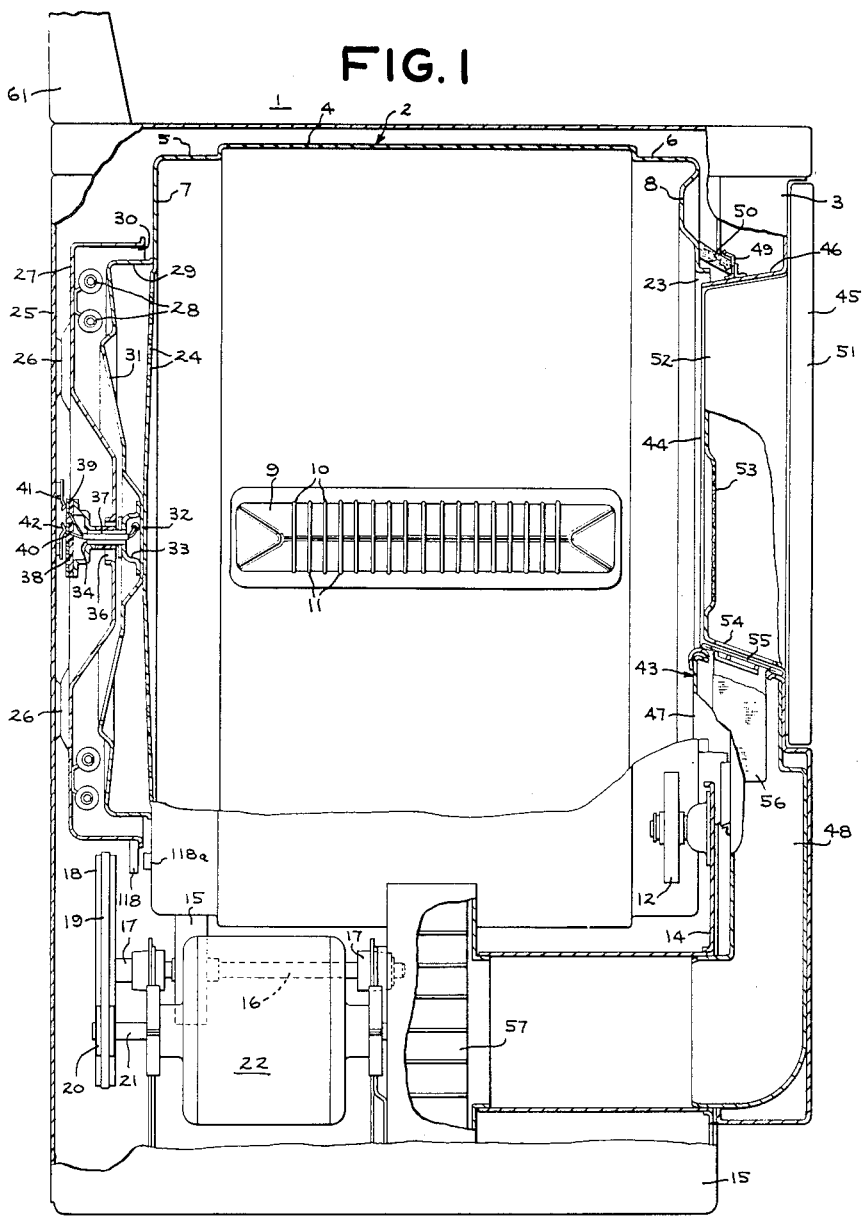
Figure 2:
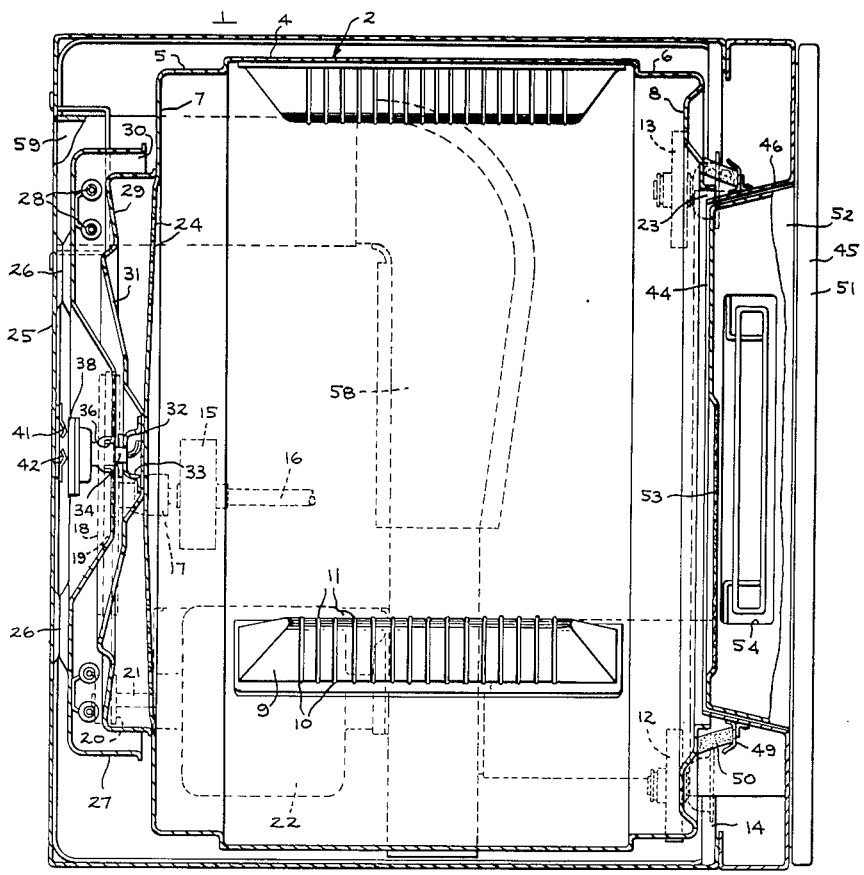
FIGURE 2 is a horizontal sectional view of the dryer of FIGURE 1, with certain surfaces broken away and partly sectionalized to illustrate further details.

Referring now to FIGURES 1 and 2, I have shown therein a domestic clothes dryer 1 including a clothes tumbling container 2 provided with a suitable outer casing or cabinet 3 which completely encloses the drum on all sides. The drum is mounted for rotation within cabinet 3 on a substantially horizontal axis and is generally cylindrical in shape, having a first cylindrical outer wall portion 4, second and third cylindrical outer wall portions 5 and 6 located respectively adjacent the ends of the drum, a back wall 7, and a front wall 8. Outer wall portions 4, 5 and 6 are imperforate over their entire length so that the entire outer shell of the basket is imperforate. On the interior surface of central portion 4 there is provided a plurality of clothes tumbling ribs 9 formed of a suitable heat resistant insulating material. Over each rib extends a number of conductors or wires 10 and 11 which alternate with each other along the length of the rib.

The front of drum 2 is rotatably supported within the outer casing 3 by a pair of idler roller wheels 12 and 13 which are rotatably secured to the top of an upwardly extending member 14 secured at its base to the bottom 15 of the machine (FIGURE 1). Rollers 12 and 13 are disposed beneath the drum in contact with portion 6 thereof. The rear end of the drum receives its support from the roller wheel 15 which is positioned beneath portion 5 of the drum in suporting and frictionally driving engagement therewith.

Roller 15 is secured on a shaft 16 supported in bearings 17. Shaft 16 is secured to a pulley 18 which is driven from a belt 19 in turn powered by a pulley 20 mounted on the end of the shaft 21 of an induction type electric motor 22. The motor, pulleys, and roller 15 are so proportioned to drum 2 and to each other that drum 2 is rotated by roller 15 at the appropriate speed to provide tumbling action for articles of clothes and other fabrics placed therein.

In order that a stream of drying air be introduced into and passed through the clothes drum, the drum is provided with a central aperture 23 in its front wall 8 and with a plurality of perforations 24 extending in an annulus around the back wall 7. Rigidly secured to the rear wall 25 and casing 3 by any desired means, such as welding at suitable points 26, for instance, is a baffle member 27. Secured thereto is heating means such as electric heaters 28 appropriately insulated from the baffle member.

Heating elements 28 may be annular in shape so as to be generally coextensive with perforations 24 and drum 2. The baffle member 29 is rigidly secured to the back wall 7 of the drum outside the ring of perforations 24 and within the stationary baffle 27, so that an annular air inlet 30 is in effect formed by the baffles 27 and 29. Baffle 29 is further provided with an annular series of openings 31. In this manner a passage is formed for air to enter annular opening 30 between the baffles, pass over the heating elements 28, then through openings 31 and perforations 24 into the interior of drum 22. In addition to the air guiding function, the baffles 25 and 27 help rollers 12, 13 and 15 to support the drum 2. Secured to the central portion 32 of baffle 29 is a bracket 33 which in turn is secured to stub shaft member 34 in substantially coaxially positioned relation to drum 2. The central portion of baffle 27 has a slot-like opening formed therein. The slot is suitably formed (as is more fully described in Patent 3,009,259 issued on November 21, 1961, to William F. Simpson and assigned to the same assignee as this invention) so as to permit stub shaft 34 a limited amount of movement in the vertical direction but virtually no movement in the horizontal direction. Thus, the slight vertical motions of the drum which result from the tumbling of the clothes can be accommodated while at the same time undesirable horizontal motion is affirmatively prevented by engagement of stub shaft 34 and slot 36.

The stub shaft 34 is provided with a central opening 37. The wires 10 and 11 all extend from ribs 9 around the back of the drum 2 and down through suitable openings in the baffle 29; the wires then extend through an opening 37 formed through the shaft 34. At the outer end of shaft 34 a disc 38 may be formed, as shown, with the conductors 10 being secured to an outer conductive ring portion 39 and the conductors 11 being secured to an inner conductive portion 40. Portions 39 and 40 are electrically insulated from each other; this may readily be done by making disc 38 of an insulating material with the ring portions embedded therein. A contact member 41 is continuously in contact with the conductor portion 39 while similarly a conductor member 42 is continuously in contact with conductor portion 40 of the disc. Thus, all the conductors 10 are connected to a stationary conductor 41 while all the conductors 11 are similarly connected to a stationary conductor 42.

The front opening 23 of the drum is substantially closed by means of a stationary bulkhead generally indicated by the numeral 43. Bulkhead 43 is made up of a number of adjacent members including the inner surface 44 of an access door 45 mounted on the dryer cabinet, a stationary frame 46 for the door, the inner surface 47 of an exhaust duct 48, and an annular flange 49 mounted on the frame 46 and on the duct wall. It will be noted that a suitable clearance is provided between the inner edge of the drum opening 23 and the edge of bulkhead 43 so that there is no rubbing between the drum and bulkhead during rotation of the drum. In order to prevent any substantial air leakage through opening 23 between the interior and the exterior of the drum, a suitable ring seal 50 preferably formed of felt-like material is secured to the flange 49 in sealing relationship with the exterior surface of drum wall 8.

Front opening 23, in addition to serving as part of the air flow path through the drum, also serves as a means whereby clothes may be loaded into and unloaded from the drum. The door 45, whose inner surface forms part of the bulkhead closing the opening, is mounted on cabinet 3. When the door is opened, clothes may be placed into or removed from the drum through the door frame 46. It will be noted that the door includes an outer flat imperforate section 51 and an inwardly extending hollow section 52 mounted on the flat outer section. Hollow section 52 extends into the door frame 46 when the door is closed, and the door surface 44 which comprises part of the combination bulkhead 43 is actually the inner wall of the hollow section.

The air outlet from the basket is provided by a perforated opening 53 formed in the inner wall 44 of door section 52. The bottom wall section 52 and the adjacent wall of door frame 46 are provided with aligned openings 54 and 55, opening 55 providing the entrance to duct 48. As shown, a lint trap 56, which may comprise a fine mesh bag, is preferably positioned in exhaust duct 48 at opening 55, the bag being supported by the door frame. Door 48 leads to suitable air moving means which may, as shown, comprise a centrifugal blower 57 mounted on the shaft of motor 22 and thus driven directly by the motor. The outlet of blower 57 communicates with an outlet duct 58 (FIGURE 2) which extends through an opening 59 in the back 25 of the cabinet 3.

Referring now to FIGURE 3 of the drawings it will be seen that above the top surface 60 of the dryer there is secured a control panel 61. As can be seen by reference to FIGURE 1, it is contemplated that control panel 61 may be made very thin in cross section so as to take up a minimum amount of the top surface 60 which is often used by operators of the machine for the folding and sorting of garments which have been in the machine. Secured within the control panel 61 is a control switch assembly 62 incorporating a manually operable member 63 having a plurality of positions each one of which, as will be further described hereinbelow, provides a predetermined sequence of operations for the machine. The control panel may also incorporate a start push-button 64 which must be pushed in order to effect starting of the machine whenever operation of the machine has been stopped for any reason.

Referring now most particularly to FIGURES 4, 5 and 6 it can be seen that control panel 61 is formed at its top with a forwardly extending member 65 which communicates with the top part 66 at its upper edge 67 so as to form an elongated enclosure. Within this enclosure there is provided a housing which may, as shown, consist of a pan-shaped member 68 connected at its top with the top part 66. Member 68 may be formed of any desired material such as for instance, one of the relatively economical molded plastics or an ordinary grade of sheet steel. The housing thus formed encloses the switch assembly 62 which controls the operation of the machine of FIGURES 1 and 2.

A suitable support member 69 formed of insulating material is secured within the housing by any suitable means such as for instance, fastening members 70. Secured on the support member 69 are a number of reed switch assemblies (FIGURE 5) 71, 72, 73, 74, 75, 76 and 77. Each reed switch assembly includes, as shown in FIGURE 4 in connection with reed switch assembly 71, an envelope of non-metallic material, conventionally made of glass, which supports and encloses a pair of reed elements of magnetic material 79 and 80.

The reed elements are quite flexible, as is well known to those familiar with this general type of switch, and under certain conditions, where they are included in a magnetic field, will be attracted to each other as a result. When this happens, the reed elements act as contacts. Each of the reed elements 79 and 80 extends to the end of the glass enevelope 78, with the glass preferably being sealed around the ends of the reed elements so as to provide a sealed dust-free enclosure. The extending ends of the reed elements have been connected to appropriate conductors as will be fully described in connection with FIGURE 7.

A manually operable member 63 extends from assembly 62 as has been described. In this connection, handle 63 is connected to an arm 81 extending through a slot 82 formed in the switch housing and in the member 65. At its inner end, the arm 81 has secured to it thereabove a wafer type magnet 83. A face 84 is formed as one pole, and its opposite face 85 is formed as the other pole. In other words, the magnet is so positioned that one of its poles faces toward the reed element 80 and the other pole faces directly away from the reed element 80.

On the other, or under side, of arm 81 there is secured a guide block 86 which seats on the base 87 of U-shaped member 68 in a slot 88 formed in a guide member 89 preferably of plastic material. As best shown in FIGURE 5, the slot 88 extends substantially the full length of the switch assembly 62. With this arrangement, then, by manual operation of member 63 the magnet is caused to move along a predetermined path which, in the present case, is a straight line. The important point of this structure is that it causes the magnet 83 to pass over one of the two reed elements of each of the reed switches 71 through 77. Preferably, the proportioning of the parts is such that the wafer magnet 83 slides along the under surface of member 69 as the guide block 86 slides along the bottom 87 of housing member 68. With this arrangement, a relatively secure positioning of the movable magnet assembly is effected with the single exception of movement along the predetermined path determined by slot 88.

In connection with certain of the reed switches (in particular, in the present control arrangement, switches 71 and 73) there are provided magnetic shield members 90 and 91. These shield members may be secured to the non-magnetic member 69, and preferably extend so as to form a magnetic flux barrier down one side between two of the reed switches. Thus, shield 90 forms a flux barrier between switches 71 and 72, and shield 91 forms a flux barrier between switches 73 and 74. In the present case, although it is not necessarily always the case as will be apparent herebelow, a pair of wafer magnets 92 and 93 are respectively secured to the shields 90 and 91 so as to be positioned above the reed switches 71 and 73; more precisely, magnets 92 and 93 are directly on the opposite side of reed elements 80 of switches 71 and 73 from the movable magnet 83.

Referring now to FIGURE 9 wherein reed switch 77 is shown with the magnet 83 directly beneath it, it will be observed that, because the face 85 of the magnet is one pole and because it is adjacent the reel element 80, the magnetic flux field will pass from the pole 85 through the reed element 80. Then, because of the positioning of the two reed elements 80 and 79, the free end of element 79 will have formed a pole of opposite polarity to the polarity of the free end of the reed element 80. The two will consequently be attracted to each other and will move into engagement as shown. The flux field then passes through back to the remote face 84 of magnet 83 at which the other pole is formed. This may either be by passage of the flux through air, or where the housing member 68 is formed of magnetic material, the flux path may utilize the housing in order to reach the face 84. In either event, it will be seen that with the wafer type magnet having one pole facing one of the reed elements and the other pole remote therefrom, and arranged so that it passes only over the one reed element of a switch, the magnet will, when it is in proximity with that reed element, cause the switch to be closed by virtue of the flux path which is completed.

Returning to FIGURES 4 and 6, when the magnet 83 is directly below one of the reed switches (such as switch 71) which has a magnet 92 thereabove, the two magnets offset each other. This is because the magnets are positioned so that like poles face each other. In other words, if a north pole of magnet 83 faces toward reed switch 71, then the magnet 92 is polarized so that, similarly, the north pole thereof faces downwardly toward the reed switch 71. By having the magnets of almost equal strength, with magnet 92 slightly weaker than magnet 83, the flux fields are cancelled by the opposing poles in the vicinity of reed element 80, and the reed switch 71 therefore assumes its normal unbiased open position. In other words, by the provision of a stationary magnet such as the magnet 92, a normally open reed switch may be caused to have a closed position at all times except when magnet 83 is moved adjacent thereto. This is in opposition to the situation of reed switches 72, 74, 75, 76 and 77 wherein the reed switches are open except when the magnet is moved adjacent thereto.

It will be observed from FIGURE 5 that magnet 83 may be positioned in any one of six different numbered positions as shown. Position 1 corresponds to an "off" position. Position 2 gives a "fluff" operation in which a brief period of tumbling without heat is provided. Position 3 provides a de-wrinkle operation in which the clothes are heated, tumbled for a period of time, and cooled. Position 4 is intended to give a damp-dry operation wherein the operation is terminated with the clothes in a damp condition. Position 5 is the setting for an economy dry wherein an automatic drying cycle on 110 volts is provided. Position 6 provides for a conventional high speed drying operation which, like position 5, is an automatic operation, but which utilizes the full available 220 volts drop across the heaters.

Figures 7, 8:
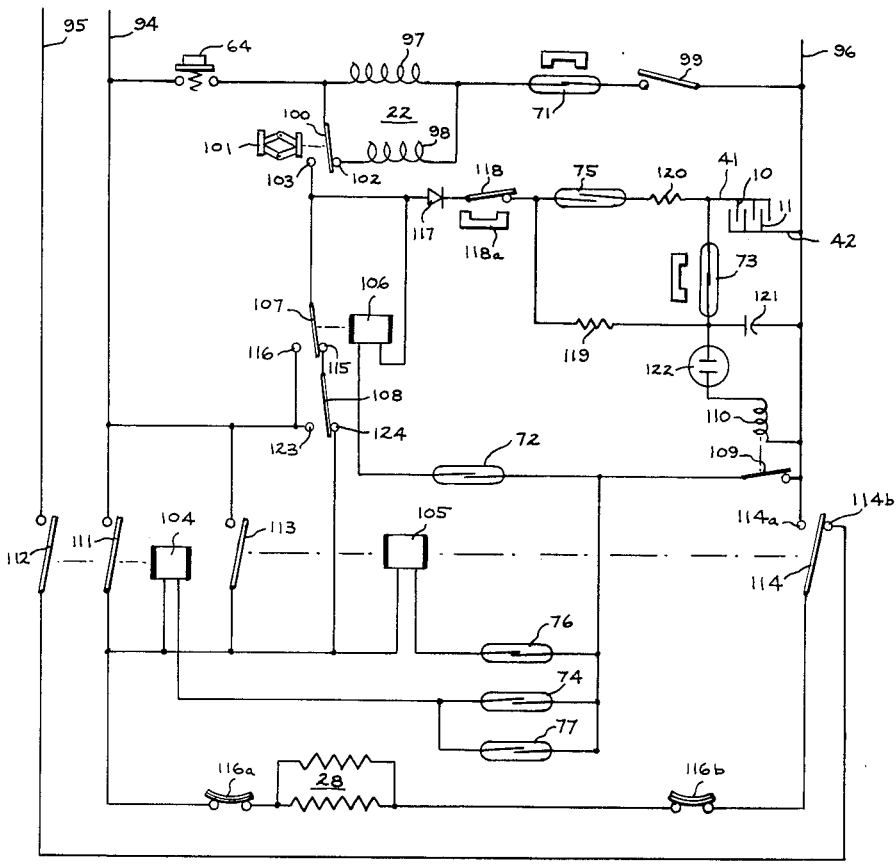
FIGURE 7 is a schematic illustration of a control circuit for the machine of FIGURES 1 and 2 which may be provided by use of the improved control assembly of my invention.
FIGURE 8 is a chart showing the condition of the reed switches in FIGURE 7 for different positions of a manually movable magnet as shown in FIGURE 5.

As shown in FIGURE 7, the entire control system of the machine may be energized across a three wire power supply system which includes supply conductors 94 and 95 and a neutral conductor 96. For domestic use, the conductors 94 and 95 will normally be connected across a 220 volt power supply, with 110 volts appearing between the neutral line 96 and each of the conductors, and with the neutral line being at ground voltage. Motor 22 is connected between conductors 94 and 96. The motor includes, in the usual manner, a main winding 97 and a start winding 98 both connected at a common end through reed switch 71 and a conventional door operated switch 99 (open when door 45 is open and closed when the door is closed) to conductor 96.

The start winding 98 is connected in parallel with main winding 97 through a switch 100 operated by a speed responsive device, schematically shown at 101, which is conventionally connected to the rotor (not shown) of motor 22. Switch 100 is engageable with either of contacts 102 or 103, being engaged with contact 102 when the machine is at rest and moving into engagement with contact 103 as the machine comes up to speed. It can readily be seen that engagement with contact 102 connects the start winding 98 in parallel with main winding 97, while movement of the switch 100 away from this position opens the start winding. Thus, as the motor comes up to speed, the start winding becomes de-energized and the motor then continues to run on the main winding 97 alone through the switch 100 and contact 103.

The starting of the motor is provided by manually operable pushbutton switch 64 which connects the motor to supply conductor 94. This switch, which is normally biased to an open position, may be pushed closed by manual operation so that energization of the motor is provided. Within a second, under normal circumstances, the motor comes up to speed so that switch 100 engages contact 103.

As a result of this movement of centrifugally operated switch 100, energizing circuits between conductors 94 and 96 are provided for three relays 104, 105 and 106 which preferably, for practical purposes, are of the type which pick up slowly and drop out rapidly. The circuit for the energization of relay 104 extends through a normally closed contact 107 controlled by relay 106, a cool-down thermostat 108, reed switches 74 and 77 in parallel with each other, and then through a contact 109 controlled by a coil 110 to the neutral conductor 96. In parallel with this, an energizing circuit for relay 105 may be completed through reed switch 76. Also, from contact 103, an energizing circuit for relay 106 extends through the relay coil itself and then through reed switch 72 in parallel with the other two relay coils.

When relay coil 104 is energized, the relay contacts 111 and 112 are closed. When relay coil 105 is energized the relay contact 113 is closed and switch 114 is moved into engagement with contact 114a, and out of engagement with contact 114b; and when relay coil 106 is energized the relay contact 107 is moved from the position shown where it engages the contact 115 over into engagement with contact 116. Closure of either of relay contacts 111 and 113 by their associated coils completes an energizing circuit for the main winding of motor 97, once the motor has started to run. This circuit extends from the contact 103 through contact 107 and cool-down thermostat 108, then through whichever of the contacts 111 and 113 is closed, to supply conductor 94. When relay coil 106 is energized, the completion of the motor circuit is directly from the contact 103 through the relay contacts 107 and 116 to conductor 94. It will be seen that in either of these last two events, a bypass around manually operable pushbutton switch 64 is completed so that when the pushbutton switch is released the motor 22 will continue to run on its main winding 97; also, whichever relay is energized because of the condition of its associated reed switch will continue to be energized.

An energizing circuit for the heater assembly 28 may be provided starting at conductor 94 and then extending through one of the two switches, or relay contacts, 111 and 113, a control thermostate 116a, the heaters 28, a second thermostat 116b, and then to the relay contacts 114 and 114b or relay 105. From the contact 114b the energizing circuit for the heaters may then extend through contact 112 of relay 104 back to conductor 95 so as to place the heater 28 across 220 volts, or else, if the relay 105 is energized, will extend from the contact 114a to neutral conductor 96 so as to place the heater across 110 volts.

It will be understood that, in a conventional manner, thermostat 116a may be of the type which is positioned so as to sense temperatures within the drum 2, and which opens at a relatively low temperature, such as for instance 135° F, so as to insure that the drying operation will be carried out at a temperature which is not undesirably high insofar as the fabrics are concerned. Similarly, the thermostat 116b may be a conventional safety thermostat which is in a position to sense the temperature of the air entering the basket. Thermostat 116b opens at a relatively high temperature such as, for instance, on the order of 300° F. to prevent fire hazards in the machine due to failure of the air flow.

It can be seen from the foregoing that by manual depression of the pushbutton switch 64 for a period of a second or so, the machine is started so that motor 22 runs continually on main winding 97 to rotate the drum 2 and operate the blower 57, and so that the heaters 28 may be energized to keep the clothes in the drum 2 at a desirable drying temperature. In order to control the length of the drying operation, a direct current circuit is provided which includes a conventional half wave rectifier 117, such as a diode, so as to cause a half wave D.C. current to pass through the components forming a part of the circuit briefly to be described (which is fully described and illustrated in my application Serial No. 169,055 filed January 26, 1962, now Patent No. 3,180,038, and assigned to General Electric Company, owner of the present application). In brief, it will be seen that the diode 117 is connected through a normally open switch 118, which also is preferably of the reed type in that it has a movable arm susceptible to magnetic influence. As can be seen by reference to FIGURE 1, switch 118 is positioned so as to be adjacent the periphery of drum 2; more particularly, switch 118 is positioned so that a magnet 118a secured to the outer surface of the drum passes adjacent switch 118 once for each revolution of the drum.

From switch 118, the circuit may either extend through a resistor 119 alone or alternatively the normally open reed switch 75 may be closed so that resistor 120 is placed in parallel with resistor 119. Resistor 119 is of a high magnitude of resistance, as high as is practical for the environment; in this connection, a value of 6 to 15 megohms has been found to be typical as discussed in my previously mentioned application. Resistor 120 is of a much lower order of magnitude, for instance 500,000 ohms. It will thus be seen that under normal circumstances resistor 119 will be in the circuit without resistor 120 although the resistor 120 may be included for special purposes.

Resistors 119 and 120 are connected in series relationship with a capacitor 121. It will readily be seen that under normal circumstances capacitor 121 and resistor 119 will together form an RC constant time delay circuit, with the length of time delay in seconds being dependent in the usual manner on the product of resistance in ohms multiplied by the capacitance in farads.

Connected across the capacitor 121 is a voltage responsive device 122, that is, a device which becomes conductive only when a predetermined voltage is placed across it. This function may readily be carried out by a relatively inexpensive glow tube. Included in series with glow tube 122 and in parallel with capacitor 121 is the coil 110 for controlling the switch 109. It will be understood that as long as the capacitor 121 is not charged up to the firing voltage of glow tube 122 there will be no current passing through the coil 110 and therefore the switch 109 will remain closed. However, when the capacitor does become sufficiently charged the glow tube 122 will fire and will continue to conduct until the capacitor is discharged to the extent that the glow tube reaches its extinguishing potential. During this brief period of time the coil 110 is energized and opens the switch 109.

It is to be noted at this point that conductors 10 and 11 are also connected across the capacitor 121. This means that as long as the clothes are wet and forming a low resistance bridge between the sensing fingers 10 and 11 there is essentially a short circuit across the capacitor and no charge occurs. As the clothes become dry, there starts to be a very appreciable resistance between fingers 10 and 11 so that charging of the capacitor occurs with the charging being subject to the characteristics dictated by the RC circuit. Thus, capacitor 121 will not even start to charge while there is a substantial amount of moisture in the clothes whenever reed switch 73 is in its normal closed position, and it will only be as the clothes start to become dry that charging of the capacitor will start to occur.

As described in my previously mentioned co-pending application, this circuit is effective to provide a sensing of the dryness of the clothes by fingers 10 and 11, with the capacitor charging at an increasing rate as the clothes become drier and finally becoming charged enough to fire glow tube 122 which causes coil 110 to open switch 109. Since switch 109 is in series with all three of the relay coils, this means that all three relay coils will be opened and operation of the machine will be terminated since a motor circuit can no longer be completed with all relay contacts and switch 64 open.

As set forth in my co-pending application, the circuitry described provides an RC time constant which, because of the drum magnet 118a and switch 118, may be caused to be fairly long so that in addition to providing sensitivity to dryness through fingers 10 and 11, the circuit is capable of performing a timing function when so desired.

Referring now to the chart of FIGURE 8 in connection with FIGURES 5 and 7, it will be observed that, for the high speed drying cycle where the manually operable member 63 is moved to the position 6 in FIGURE 5, reed switches 71 through 76 are unaffected by the magnet and are therefore in their normal positions as shown in chart 8. Reed switch 77 is moved from its normally open position to a closed position. For this arrangement then, when the button 64 is depressed, the motor will start and once it comes up to speed relay 104 will be energized through reed switch 77, the other two relays remaining deenergized because their associated reed switches are open. This means that contacts 111 and 112 will be closed, and contact 114 will be in the position shown. With the contacts of relay 104 closed, the heater 28 is energized across 220 volts and the main winding 97 of motor 22 is energized even after pushbutton 64 is released. As a result tumbling of the clothes, blowing of air through the drum, and heating of this air under the control of the thermostat 16a will proceed until the clothes become sufficiently dry so that fingers 10 and 11 slowly provide an increased resistance and capacitor 121 charges. The charging continues as the clothes dry until coil 110 opens contact 109 to end the heat drying cycle which, with the elements properly related to each other as explained in my aforementioned co-pending application, occurs upon a dry condition of the clothes.

Where so desired, a thermostat 108 may be included: this thermostat closes with contact 123 during ordinary drying temperatures, but moves back into engagement with contact 124 as the clothes become cooler. As long as thermostat 108 engages contact 123, an energizing circuit for motor 22 continues to be completed even though heater 28 can no longer be energized. This causes blower 57 to keep operating, cooling the clothes until thermostat 108 returns into engagement with contact 124 thereby de-energizing motor 22 to completely terminate the operation.

Assuming that an economy dry operation is desired, with the only difference from the high speed drying operation being that 110 volts current is used rather than the 220 volt current, the manual member 63 is moved to position 5. In this position, it will be observed that it affects only reed switch 76, causing that normally open switch to become closed. All the other six reed switches are in their normal positions as shown. With the reed switches in this position, when the motor is started by depression of the button 64 only relay 105 will be energized through reed switch 76, since the reed switches associated with the other relays will be open. As a result, contact 114 will move over to engage contact 114a and contact 113 will close. The closing of contact 113 permits continued operation of the motor after switch 64 is released and opened, and the movement of contact 114 causes the drying to be provided on 110 volts instead of 220 volts. The control of the machine is the same as before, that is, the fingers 10 and 11 act as a circuit of gradually increasing resistance around capacitor 121 until finally the clothes reach a point of dryness at which glow tube 122 fires and contact 109 opens to end the cycle as before.

When a damp dry condition is desired, member 63 is moved to position 4. In this position it causes closure of normally open reed switches 74 and 75 but does not affect the normal position of the other reed switches as shown in FIGURE 8. The closure of reed switch 74 insures that relay 104 will be energized when the motor starts up, and the closure of reed switch 75 puts the relatively low resistance 120 in parallel with the high resistance 119. With this arrangement, the result of starting the motor up by depression of switch 64 is substantially the same as it was for the high speed operation, since it will readily be seen that closure of either of reed switches 74 or 77 effects exactly the same purpose. The decrease in the resistance by the closure of reed switch 75 effects the single change in the cycle that there is a substantial decrease in the amount of time before the capacitor is charged sufficiently to cause ending of the cycle. The resistances are tailored to each other so that this is caused to occur when the clothes are in a damp condition ready for ironing, as opposed to the dry condition provided by the high speed operation.

When a de-wrinkle operation is desired, the member 63 is moved to position 3 in FIGURE 5. In this position, it affects only switches 73 and 74: the normally closed switch 73 is caused to be opened as previously explained, and the normally open switch 74 is closed. The closure of reed switch 74 causes the relay 104 to be energized upon starting the motor as previously explained. The opening of reed switch 73, together with the normally open condition of reed switch 75 causes the sensing fingers 9 and 10 to be entirely removed from the circuit. As a result, the drum magnet 118a and switch 118, together with capacitor 121, form an intermittent RC type system and cause a predetermined amount of heated operation to be provided without regard to the dryness condition of the clothes. At the end of the predetermined length of time, the switch 109 will open to de-energize the relay 104 and terminate the sequence of operations with a cool down as previously described.

When a fluff cycle is desired, wherein the clothes are tumbled for a period with no heat at any time, member 63 is moved to position 2 as shown in FIGURE 5. In this position it will be seen that only switches 72 and 73 are affected, with switch 72 being moved from its normally open position to a closed position and switch 73 being moved from its normally closed position to an open position. The closure of switch 72 causes energization of relay 106 when button 64 is depressed. As a result, contact 107 moves from engagement with contact 115 to engagement with contact 116 to provide the necessary motor bypass around switch 64 so that it may be released. It will be seen that no circuit is completed for the heaters so that no heat is provided to the air passing through the drum. Also, as for the de-wrinkle cycle, switch 73 is opened so that a pure timing function, entirely independent of the sensing fingers 10 and 11, is provided once again. Thus a timed unheated cycle may be provided with this arrangement until the capacitor charges sufficiently to end the cycle. The only difference here is that, because of the difference of positioning of contact 107 from the positioning of contacts 111 and 113, there is no cool-down period after contact 109 has opened and the cycle is ended right at that time.

When the member 63 is moved to the position 1 in which it is shown in FIGURE 5, then only reed switch 71 is affected, and it is moved from its normally closed position to a normally open position. The use of the shield 90 about switch 71 permits switches 71 and 72 to be positioned quite closely together and the magnet to be positioned as shown in FIGURE 5 without affecting switch 72. This results because a substantial part of the magnetic flux is shunted away from switch 72 by the shield 90.

It will thus be seen that my invention may be used in a complete and operative dryer structure to effect the control of the dryer, and that this control is effected by means of a highly simplified and economical switch assembly structure. It will further be seen that the components permit the use of a relatively thin control panel which does not need to contain heavy components.

While in accordance with the patent statutes I have described what at present is considered to be the preferred embodiment of my invention, it will be obvious to those skilled in the art that various changes and modifications may be made therein without departing from the invention. It is therefore aimed in the appended claims to cover all such equivalent variations as fall within the true spirit and scope of my invention.

What I claim as new and desire to secure by Letters Patent of the United States is:

1. A switch assembly including a housing, a plurality of magnetic reed switches secured within said housing in spaced relation to each other and each including a pair of normally separated magnetic reed elements deflectable into engagement with each other, a permanent magnet having one pole facing said reed switches and the other pole facing away from said reed switches, means extending through said housing for moving said magnet along a predetermined path within said housing, said predetermined path extending across said reed switches so that said magnet may be moved selectively into proximity with a single reed element of each of said reed switches to complete a flux path extending from said one pole through said single reed element of said selected reed switch to the other reed element of said selected reed switch, said magnet being large enough to bridge the space adjacent two of said reed switches, and a shield of magnetic material extending between said two adjacent reed switches and part of the way around one of said adjacent reed switches thereby to form a magnetic shield which shunts the flux away from the other of said adjacent reed switches until said magnet is directly opposite said other adjacent reed switch.

2. The apparatus defined in claim 1 wherein said predetermined path is formed as a straight line with said reed elements positioned substantially at right angles to said path and movable in a plane perpendicular to said path.

3. The apparatus defined in claim 1 wherein said magnet is a wafer magnet.

References Cited by the Examiner
UNITED STATES PATENTS

| | | | |
|---|---|---|---|
| 2,826,825 | 3/58 | Morrison | 34—45 |
| 2,851,789 | 9/58 | Dunkelman | 34—45 |
| 3,012,116 | 12/61 | Boylan | 200—87 |
| 3,074,353 | 1/63 | Devonshire | 200—87.3 |
| 3,087,030 | 4/63 | Shebanow | 200—87 |

OTHER REFERENCES

German printed application, printed December 1960, 1,095,360.

WILLIAM F. O'DEA, *Acting Primary Examiner.*
NORMAN YUDKOFF, *Examiner.*